(No Model.)
H. W. PRICE.
GLOVE LINING.
No. 261,040. Patented July 11, 1882.
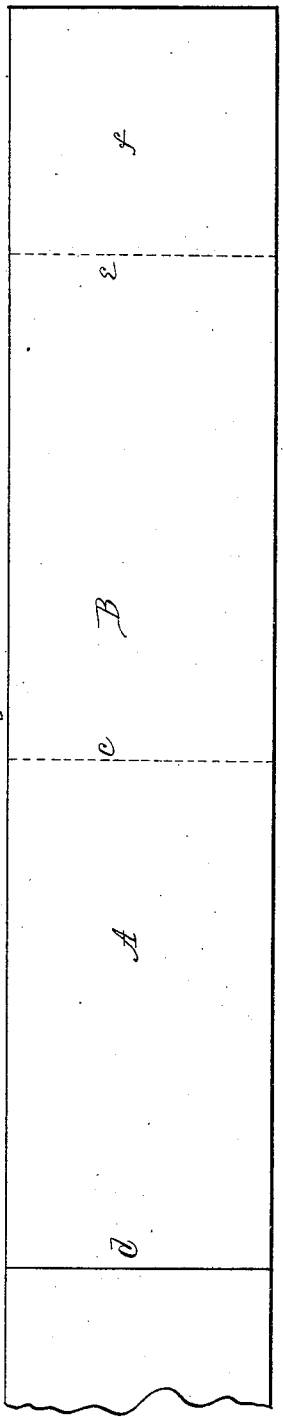
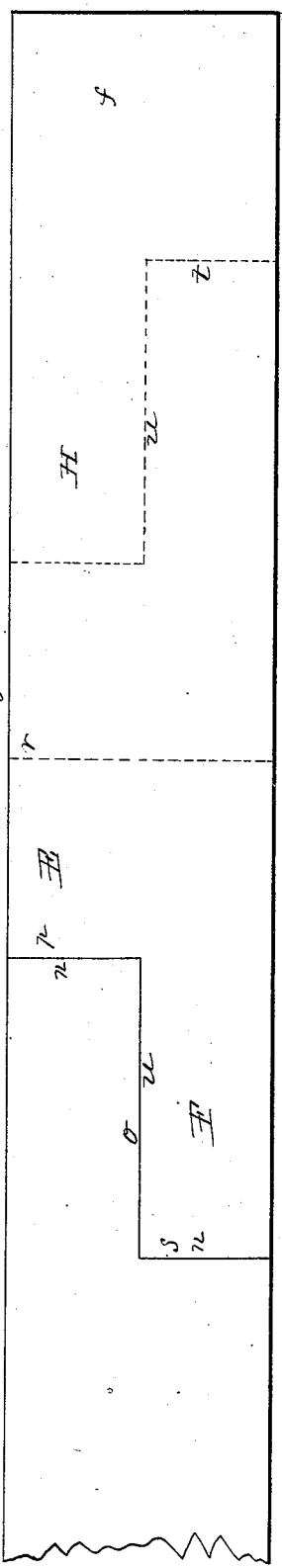
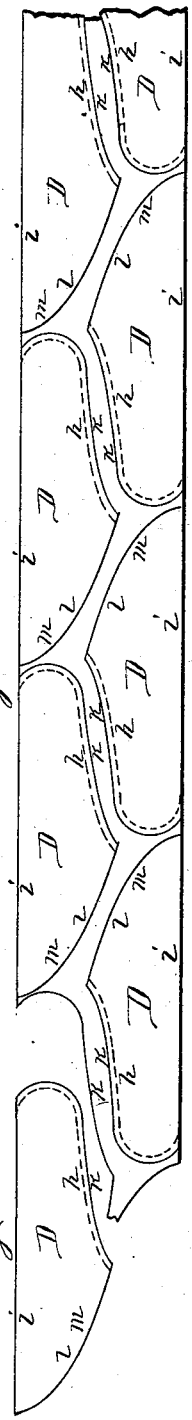
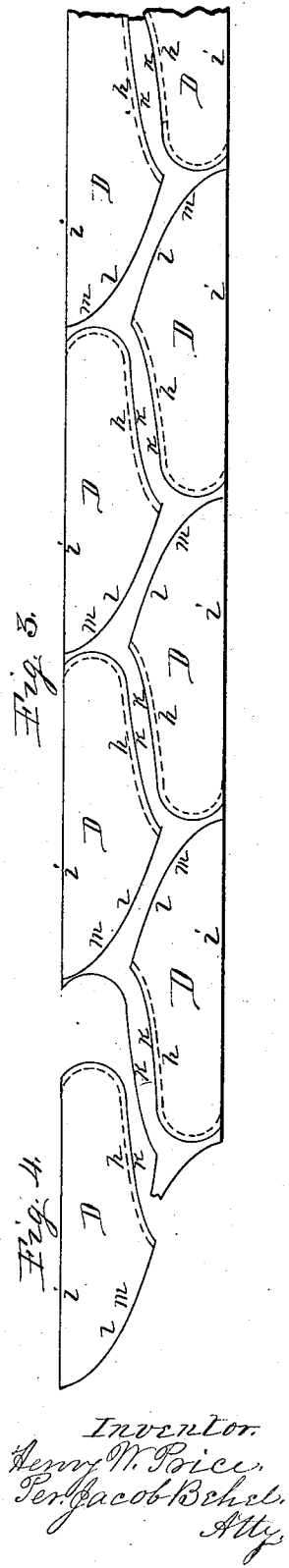
Witnesses.
A. O. Behel
Robert Falconer
Inventor.
Henry W. Price,
Per Jacob Behel.
Atty.

(No Model.) 4 Sheets—Sheet 2.
H. W. PRICE.
GLOVE LINING.
No. 261,040. Patented July 11, 1882.
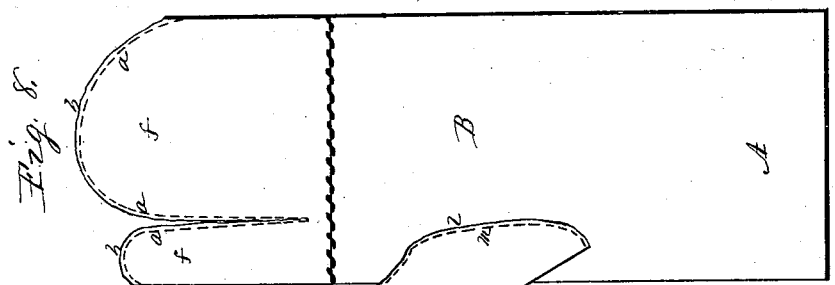
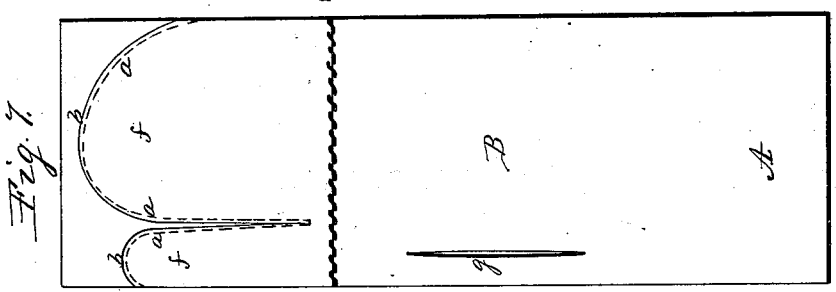
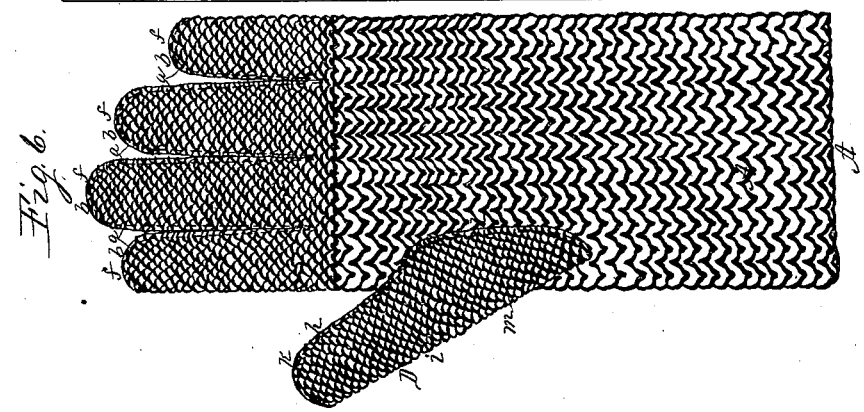
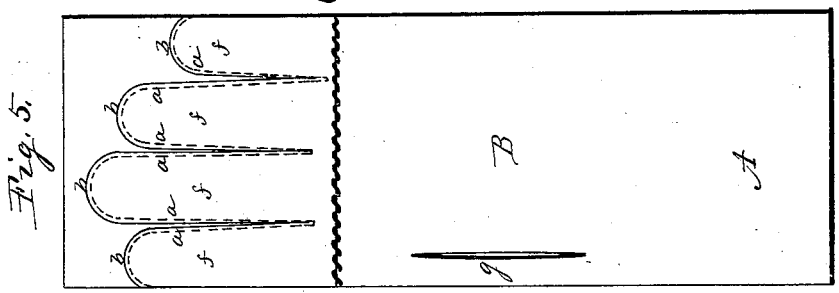
Witnesses.
A. T. Behel
Robert Falconer
Inventor
Henry W. Price
Per Jacob Behel.
Atty.

(No Model.)  4 Sheets—Sheet 3.
H. W. PRICE.
GLOVE LINING.
No. 261,040. Patented July 11, 1882.
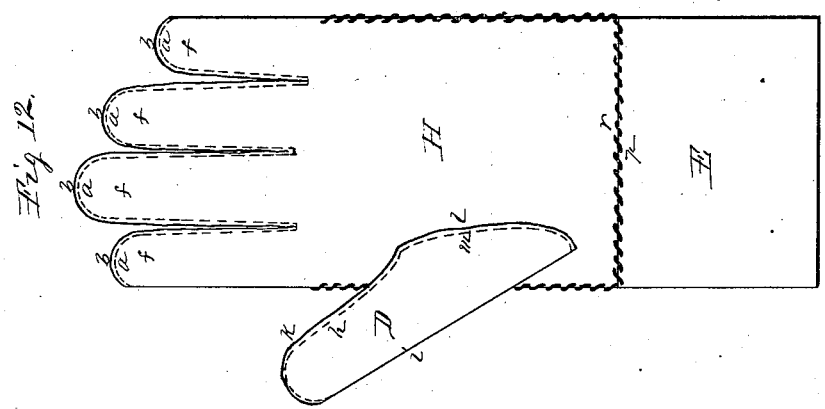
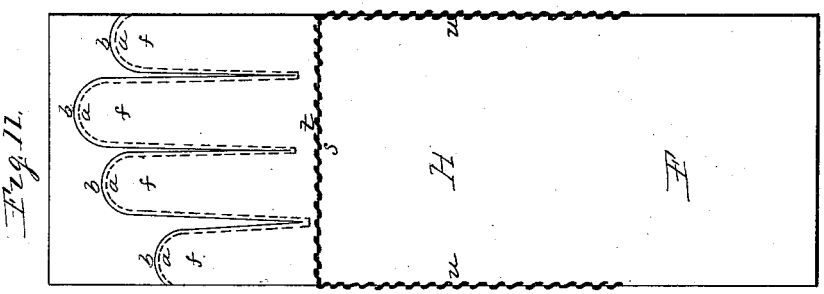
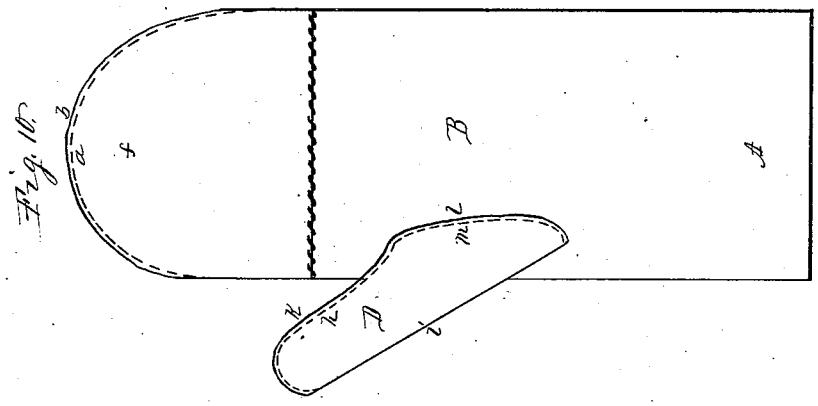
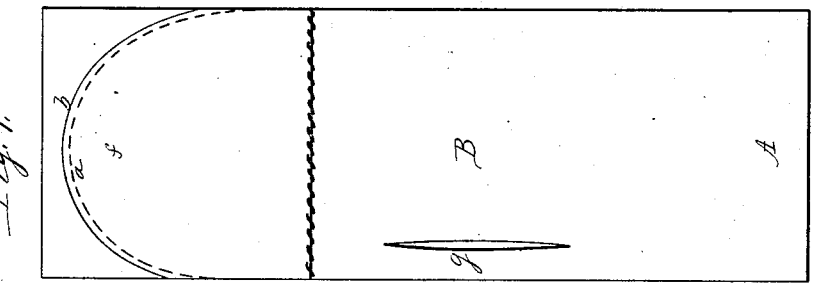
Witnesses.
A. O. Behel
Robert Falconer
Inventor.
Henry W. Price
Per Jacob Behel
Atty.

(No Model.)  4 Sheets—Sheet 4.

H. W. PRICE.
GLOVE LINING.

No. 261,040.  Patented July 11, 1882.

Witnesses,
A. O. Behel
S. A. H. Behel

Inventor
Henry W. Price
Per Jacob Behel
Atty.

UNITED STATES PATENT OFFICE.

HENRY W. PRICE, OF ROCKFORD, ILLINOIS.

GLOVE-LINING.

SPECIFICATION forming part of Letters Patent No. 261,040, dated July 11, 1882.

Application filed January 20, 1882. (No model.)

*To all whom it may concern:*

Be it known that I, HENRY W. PRICE, a citizen of the United States, residing in the city of Rockford, in the county of Winnebago and State of Illinois, have invented a new and useful Improvement in Linings for Gloves and Mittens, of which the following is a specification.

My invention relates to the manufacture of gloves and mittens; and it consists in producing a lining of knit or looped fabrics to be employed mainly in gloves and mittens in which leather, felt, or woven fabrics are employed as facings for the more exposed portions of the gloves or mittens, and capable of use as a lining in gloves or mittens produced from leather, felt, or woven fabrics. To this end I have produced the linings represented in the accompanying drawings, in which—

Figure 13:
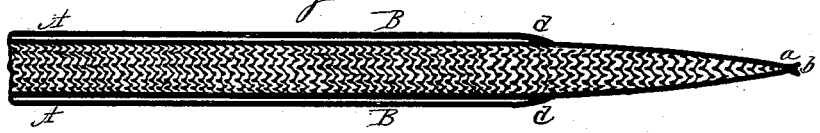
Figure 14:
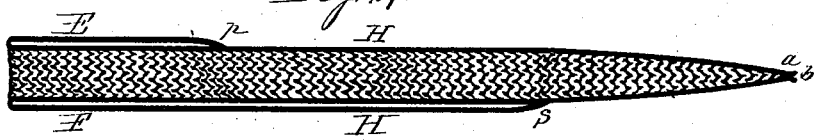

Figures 1, 2, and 3 represent a tubular knit fabric from which to produce my improved linings for gloves or mittens, and these several figures represent what is known as the "wrong side" of the goods. Fig. 4 represents a thumb portion fitted to be inserted in the glove or mitten. Fig. 5 represents the palm of a glove-lining with fingers stitched, hand portion folded and stitched or crocheted, and thumb-seat cut. Fig. 6 represents the palm of the completed glove-lining. Fig. 7 represents the palm of a two-fingered-glove lining with fingers stitched, hand portion folded and stitched or crocheted, and thumb-seat cut. Fig. 8 represents the palm of the two-fingered-glove lining complete. Fig. 9 represents the palm of a mitten with rounded point stitched, hand portion folded and stitched or crocheted, and thumb-seat cut. Fig. 10 represents the palm of the mitten-lining complete. Fig. 11 represents the back of a glove-lining with fingers stitched, wrist and back folded, back stitched, forming a double back and wrist. Fig. 12 represents the palm of Fig. 11, showing the complete lining with wrist and back double. Fig. 13 is a lengthwise section cut centrally through the longest finger in Fig. 6. Fig. 14 is a lengthwise section cut centrally through the longest finger in Fig. 12.

The knit fabric represented in Figs. 1, 2, and 3, from which to produce my improved linings for gloves and mittens, is produced in tubular form, either in sections of proper length from which to produce a single glove-lining or a pair of glove or mitten linings, or in pieces of any convenient or proper length from which the linings may be cut into proper lengths from which to produce a glove or mitten lining. The end portions of these sections are stitched in lines *a*, forming the outlines of the fingers of a glove—a two-fingered glove or of other known forms of gloves—or in the finger-end form of a mitten, after which the fabric is cut in outline as represented in the lines *b*, to separate the fingers of the glove-linings and remove the surplus material to reduce the fingers and finger ends of the linings of the gloves and mittens to the proper form.

In the gloves and mittens represented in the drawings in all the figures from 5 to 10, inclusive, the hand portion is double. This double portion of the lining I produce by turning the open wrist end portion A from the dotted wrist-line *c*, Fig. 1, outward over the hand portion B until its free end *d* meets the dotted line *e* at or near the junction of the fingers *f* with the hand portion B, at which point or line its free end *d* is suitably joined to the hand portion by crocheting, seaming, or otherwise. This double hand portion is provided with a thumb-seat, *g*, which is produced by cutting through the two thicknesses, producing a slot lengthwise of the glove of sufficient length to receive the seat portion of the thumb.

At Fig. 4, D represents a thumb-lining fitted for insertion in the hand portion of the lining. These thumb-linings I prefer to produce from tubular knit fabrics, substantially the same as that from which I produce the main portion of the lining, and in the manner represented in Fig. 3, in which the outline of the under edge and outer edge of the thumb is formed by stitching or seaming in the line *h*, and its outer or upper edge outline, *i*, is formed in the edge fold of the tubular fabric. These thumb portions D are of such conformation and of such size and the tubular knit fabric of such width as to permit of the forms overlapping each other, or lapping past or by each other, as represented in Fig. 3, in such a manner as to produce but little waste.

After the outline forms of the thumb D are produced in the tubular fabric by the stitched or seamed lines *h* and folded lines *i* they are separated from the tubular fabric and from each other by cutting outside of and between the lines of stitching on the lines $k$, forming the extreme outlines of the outer end and under edge of the thumb, and cutting on the line $l$, forming the seat end portion $m$, producing the thumb D, as at Fig. 4.

The seat $m$ of the thumb is then joined to the thumb-seat $g$ in the hand portion of the lining by stitching or seaming, which completes the lining, as represented in Figs. 6, 8, and 10, fitted to receive the leather or other suitable facings, or to be inserted into a glove or mitten and joined or fixed thereto in any suitable manner. These linings are capable of use in full leather, felt, or cloth gloves or mittens of perhaps all varieties requiring a lining, and are also capable of use in perhaps all varieties of gloves or mittens produced with leather, felt, or cloth facings, such as the articles now in common use formed with palm, thumb, finger, and edge facings produced from the various materials employed in the manufacture of gloves and mittens.

At Figs. 11 and 12 I have represented a form of my improved lining especially designed for that variety of gloves and mittens in which palm, thumb, and edge facings are employed, and in which the back of the hand and the wristlets are produced in knit or woven fabrics. These linings are produced from the same kinds of tubular knit fabrics that the linings represented in Figs. 6, 8, and 10 are produced; and the fingers and thumb portions are in every particular the same, and are produced from the tubular fabric and joined to each other in identically the same manner.

In this form of my improved lining the palm portion is of but a single thickness, and only the wristlet and the back of the hand portion are double. This feature I readily produce from the same tubular fabric by cutting it at the proper points on the transverse lines $n$ from opposite sides to its lengthwise center line, and then connecting the inner ends of these transverse cuts by a lengthwise central cut on the line $o$. This cut open wrist end portion, E, and back portion, F, are turned outward over the hand portion H until the free end $p$ of the wrist portion meets the dotted line $r$ on the palm portion of the lining, and the free end $s$ of the back meets the dotted line $t$ on the back portion of the hand at or near the junction of the fingers with the hand portion of the lining, at which points they are suitably joined to the hand portion of the lining in any suitable manner, by crocheting, seaming, or otherwise. The lengthwise side edges, $u$, of the back portion of the hand may also be joined to the hand portion of the lining by stitching or otherwise.

I also produce from the tubular knit fabric a single lining, designed to be employed in connection with a full leather, felt, or woven-fabric glove or mitten; and so far as relates to the fingers and thumb these single linings are in every particular the same as the lining hereinbefore described; and are produced in identically the same manner; but for this purpose I cut the tubular fabric on a transverse line at the proper point to meet the requirements of the glove or mitten for which the lining is intended.

From the foregoing it will be seen that from a tubular knit or looped fabric I produce in the same manner double or single linings for perhaps about all the varieties of gloves or mittens in general use requiring linings.

I claim as my invention—

1. A glove or mitten lining produced from a tubular knit or looped fabric, having the fingers produced by stitching and cutting, substantially as and for the purpose hereinbefore set forth.

2. A glove or mitten lining produced from a tubular knit or looped fabric, having the hand portion double by overlapping and the fingers and thumb produced by stitching and cutting, substantially as and for the purpose hereinbefore set forth.

3. A glove or mitten lining having a palm of single ply, a back and wristlet of double ply produced from tubular knit or looped fabric by cutting and folding, and fingers and thumb produced by stitching and cutting, substantially as and for the purpose hereinbefore set forth.

4. A thumb for glove or mitten linings produced from a tubular knit or looped fabric by stitching and cutting, the forms overlapping or lapping past each other in the fabric, substantially as and for the purpose hereinbefore set forth.

HENRY W. PRICE.

Witnesses:
JACOB BEHEL,
A. O. BEHEL.